United States Patent Office 3,423,402
Patented Jan. 21, 1969

3,423,402
NOVEL BIBENZO[b,f][1,4]OXAZEPIN 11-ONES
Kuppuswamy Nagarajan, Bombay, India, assignor to Ciba Limited, Basel, Switzerland, a Swiss company
No Drawing. Filed June 20, 1966, Ser. No. 558,621
Claims priority, application Switzerland, June 23, 1965, 8,805/65; Apr. 27, 1966, 9,092/66
U.S. Cl. 260—239.3         11 Claims
Int. Cl. A61k 25/00; C07d 107/00

The present invention relates to the manufacture of 10-aminoalkyl-11-X-10,11-dihydro - dibenzo[b,f][1,4]oxazepines, in which X represents an oxo group, and the amino group is separated from the ring-nitrogen atom by at least two carbon atoms, and which contain in at least one of the benzo-rings a nitro group.

An alkylene residue that connects the amino group with the ring nitrogen atom of the dibenzo[b,f][1,4]oxazepine ring is more especially a lower alkylene group having at most 7, and preferably 2–4 carbon atoms; suitable lower alkylene residues of this type are, for example, 1,2-ethylene, 1-methyl-1,2-ethylene, 2-methyl-1,2-ethylene, 1,3-propylene, 2-methyl-1,3-propylene, 1,3- or 1,4-butylene groups, and also 1,5-pentylene or 1,6-hexylene group.

The amino group of an amino-substituted alkyl residue may be unsubstituted, but is preferably substituted and is therefore especially a tertiary or secondary amino group. Substitutents of a substituted amino group are aliphatic, cycloaliphatic, cycloaliphatic-aliphatic, armoatic or araliphatic residues, which may contain further substituents. Such groups are primarily alkyl, especially lower alkyl groups, e.g. methyl, ethyl, n-propyl, isopropyl, n-butyl, isobutyl, n-pentyl, isopentyl, n-hexyl or n-heptyl groups, as well as alkenyl, especially lower alkenyl groups, e.g. allyl or methallyl groups, but also cycloalkyl groups, preferaby those having 3–8, and especially, 5–7, ring carbon atoms, e.g. cyclopentyl, cyclohexyl or cycloheptyl groups; cycloalkyl-lower alkyl groups, preferably having 3–8, and especially 5–7, ring carbon atoms, e.g. cyclopentylmethyl, cyclohexylmethyl, cyclohexylethyl or cycloheptylmethyl groups; phenyl residues or phenyl-lower alkyl residues, e.g. benzyl, 1-phenylethyl or 2-phenylethyl residues. These groups may contain additional substituents, such as lower alkyl, hydroxyl, etherified hydroxyl, such as lower alkoxy, trifluoromethyl, nitro, amino, or esterified hydroxyl groups, such as halogen atoms, e.g. methyl, ethyl, n-propyloxy, isopropyloxy, butyloxy, methylamino, dimethylamino, diethylamino, allylamino, piperidino, morpholino or 4-lower alkyl-piperazino groups, or fluorine, chlorine or bromine atoms.

In tertiary amino groups the two substituents may be joined together and constitute a divalent residue, which forms with the nitrogen atom an alkyleneimino group having 3–8, and preferably 5–7 ring members, e.g. a pyrrolidino, piperidino, 2-methyl-piperidino, 3-ethyl-piperidino, hexahydroazepino or octahydroazocino group, an azaalkyleneimino group having 6–8, and preferably 6 ring members, and especially a substituted aza-nitrogen atom, e.g. a 4-methyl-piperazino, 4-β-hydroxyethylpiperazino, 4-phenyl-piperazino, 4-carbethoxypiperazino, 4-methyl-N,N-(3-aza-1,6-hexylene)-imino or 5 - methyl-N,N-(4-aza-1,7-heptylene)-imino group, an oxa- or thiaalkyleneimino group having preferably 6 ring members, e.g. a morpholino or thiamorpholino group.

Furthermore, one of the substituents of a substituted amino group may be a divalent hydrocarbon residue, especially an alkylene residue advantageously containing 2–5 carbon atoms, which residue is bound to a carbon atom of the alkyl residue carrying the amino group. Such groups are, for example, 1-methyl-, or 1-ethyl-3-pyrrolidino, 3-piperidino or 4-piperidino groups, which may be found directly or through an alkylene residue, such as a methylene or 1,2-ethylene group, to the ring nitrogen atom of the 10,11-dihydro-dibenzo[b,f][1,4]oxazepine.

The group X in the 11-position of the 10,11-dihydrodibenzo[b,f][1,4]oxazepine ring is advantageously an oxo group.

The compounds of the present invention contain in the benzo-rings of the tricyclic 10,11-dihydro-dibenzo[b,f][1,4]oxazepine ring system advantageously one, or two or more, nitro groups, which may be present in any position, but advantageously the 2- and/or 7-position, or also the 3-position. In addition to nitro groups the aromatic rings may contain one, two or more further identical or different substituents, such as lower alkyl groups, etherified hydroxyl groups, e.g. lower alkoxy, trifluoromethyl groups or esterified hydroxyl groups, e.g. halogen atoms, such as the above mentioned substituents. They may, however, also contain acyl groups, such as lower alkanoyl, e.g. acetyl, propionyl or butyryl groups, as well as if desired, substituted, e.g. mono- or di-substituted amino groups, the substituents of amino groups being primarily aliphatic groups, such as alkyl, especially lower alkyl groups.

The compounds of the present invention are preferably 10,11-dihydro-dibenzo[b,f][1,4]oxazepine of the Formula I

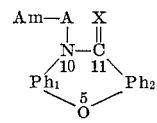

in which Am is an amino group, A is an alkylene residue, separating Am from the ring nitrogen atom by at least 2 carbon atoms, and X represents an oxygen atom, and at least one of the 1,2-phenylene groups Ph₁ and Ph₂ is substituted by a nitro group.

The compounds of the invention possess valuable pharmacological properties and can be used correspondingly. Thus, they exhibit an anti-acetyl-choline, anti-serotonine and antihistamine action and also anti-inflammatory, local anaesthetic or psychopharmacological properties, primarily antidepressive effects, which can be detected by animal tests, for example, on mice and monkeys. Thus, they exhibit, for example, a reversible action on the hypothermia and ptosis produced by reserpine and/or raise to a high power the action of 3,4-dihydroxyphenyl-alanine in mice treated with monamine oxidase inhibitors. The compounds are therefore primarily useful as anti-depressive agents for the treatment of depression states and also as antihistaminics. Antidepressive effects can be produced with these compounds using oral or parenteral doses of about 0.05 g. to about 0.2 g. per day. They can also be used as intermediate products for the manufacture of other pharmaceutically useful compounds.

The invention provides, more especially, compounds of the Formulae Ia and Ib

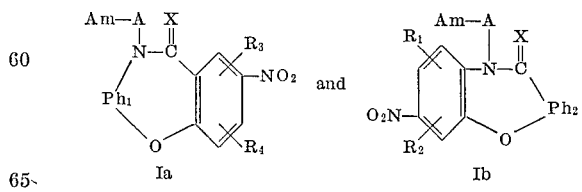

in which Am, A and X have the meanings given above, each of the residues Ph₁ and Ph₂ represents a 1,2-phenylene group that may be substituted as stated above, and each of the groups R₁, R₂, R₃ and R₄ represents hydrogen or a lower alkyl, lower alkoxy, trifluoromethyl, nitro or amino group or a halogen atom.

Especially valuable are compounds of the Formula II

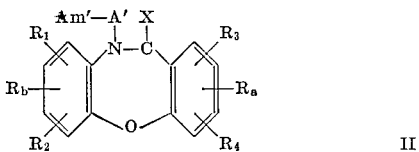

in which one of the symbols $R_a$ and $R_b$ represents a nitro group and the other a nitro group or a hydrogen atom, Am' represents a tertiary amino group, especially a di-lower alkylamino group, an alkyleneimino group, in which alkylene contains 4–6 carbon atoms in the chain, a piperazino group, such as a 4-loweralkyl-piperazino group, a morpholino group or a thiamorpholino group, or stands for a secondary amino group, especially a lower alkylamino group, A' represents a lower alkylene residue separating Am' by at least two carbon atoms from the ring nitrogen atom of the 1,4-oxazepine ring, each of the groups $R_1$, $R_2$, $R_3$ and $R_4$ has the meaning given above, and X is an oxygen atom. Compounds of this type are those of the Formulae IIa and IIb

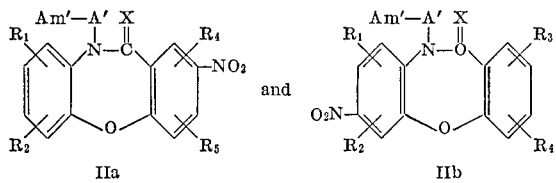

in which Am', A', X, $R_1$, $R_2$, $R_3$ and $R_4$ have the meanings given above.

The invention provides, more especially, compounds of the Formula III

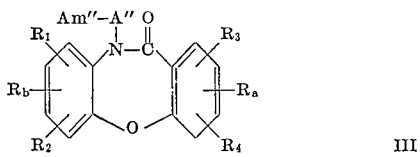

in which $R_a$, $R_b$, $R_1$, $R_2$, $R_3$ and $R_4$ have the meanings given above, $R_1$, $R_2$, $R_3$ and $R_4$ being preferably hydrogen atoms, Am" represents a di-lower alkylamino group, an alkyleneimino group having 4–6 carbon atoms in the alkylene chain, a 4-lower alkylpiperazino group or a morpholino group, but also a lower alkylamino group, and A" represents a lower alkylene residue that separates Am" by at least 2, and especially by 2–3, carbon atoms from the ring nitrogen atom of the 1,4-oxazepine ring. Compounds of this type are those of the Formulae IIIa and IIIb

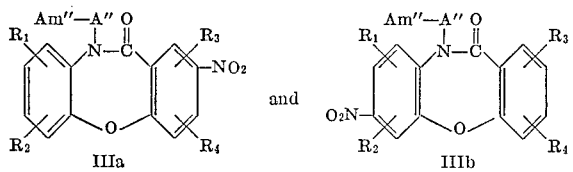

in which AM", A", $R_1$, $R_2$, $R_3$ and $R_4$ have the meanings given above.

An especially pronounced anti-depressive action is exhibited by 10 - (3-dimethylamino-propyl)-2-nitro-11-oxo-10,11-dihydro-dibenzo[b,f][1,4]oxazepine, 10-(3-methyl-amino-propyl) - 2 - nitro - 11 - oxo - 10,11-dihydro-dibenzo[b,f][1,4]oxazepine and 10 - (3 - dimethylamino-propyl) - 7 - nitro - 11 - oxo - 10,11 - dihydro-dibenzo-[b,f][1,4]oxazepine; these compounds exhibit an excellent anti-depressive action when administered orally or parenterally in daily doses of about 0.05 gram to about 0.2 gram.

The compounds of the invention can be made by methods in themselves known, for example, (a) by converting the residue $R_0$ in 10 - $R_0$ - 11-X-10,11-dihydro-dibenzo-[b,f][1,4]oxazepines, which in at least one of the benzo rings contain a nitro group, and in which $R_0$ is a residue convertible into an aminoalkyl group or a salt thereof, into an aminoalkyl group, in which the amino portion is separated from the ring-nitrogen atom by at least 2 carbon atoms, or (b) ring-closing o-N-(aminoalkyl)-N-$X_0$-amino-o'-$X_0^a$-diphenyl ethers, in which the two amino groups are separated from one another by at least 2 carbon atoms and at least one of the phenyl residues carries a nitro group, and in which $X_0$ is a hydrogen atom or an acyl group and $X_0^a$ represents a residue, which under the ring-closing conditions furnishes the group of the formula —C(=X)—, and optionally converting an aminoalkyl group in a compound so obtained into a different aminoalkyl group.

The symbol $R_0$ is preferably a hydrogen atom, but it may also be a reactive esterified hydroxy-alkyl residue or an $R^0$-aminoalkyl group, in which the symbol $R^0$ represents a residue capable of being split off, and is converted in a manner in itself known into the desired aminoalkyl group. Thus, a starting material in which $R_0$ is a hydrogen atom, or a suitable salt, especially an alkali metal salt, such as a lithium, sodium or potassium salt thereof (which can be formed, for example, by treatment with a salt-forming agent, such as an alkali metal, or an alkali metal hydride, amide, alkoxide or hydroxide, or an organic alkali metal compound, prior or during the reaction, the latter, for example, by carrying out the reaction in the presence of a salt-forming agent, for example, an alkali metal carbonate) may be reacted with a reactive ester of an aminoalkanol or an acid addition salt thereof. Reactive esters are those of hydrohalic acids, e.g. hydrochloric acid or hydrobromic acid, strong organic sulphonic acids, such as methane sulphonic, p-toluene sulphonic, 4-bromobenzene sulphonic or 3-nitrobenzene sulphonic acid, or carbonic acid or especially with derivatives thereof, such as lower alkyl- or halogeno-carbonic acids.

Reactive esters, particularly those with carbonic acid derivatives may also be formed in situ, for example, by reacting an aminoalkanol, especially a tertiary aminoalkanol, with a suitable carbonic acid derivative, such as a carbonic acid dihalide, e.g. phosgene, in the presence of a 10-unsubstituted 11-X-10,11-dihydro-dibenzo[b,f][1,4]oxazepine. Such reaction can also be carried out in steps and/or in reverse order; thus, the 10-unsubstituted 11-X-10,11-dihydro-dibenzo[b,f][1,4]oxazepine may first be treated with the carbonic acid derivative, such as phosgene and the aminoalkanol may then be added. As an intermediate, there may be formed in such reaction a 10-$R_0$-11 - X - 10,11-dihydro-dibenzo[b,f][1,4]oxazepine compound, in which $R_0$ is an aminoalkoxycarbonyl residue to be isolated and independently used as a starting material, from which, preferably after converting an acid addition salt resulting during the formation of such intermediate into the free base, carbon dioxide is split off under the conditions of the reaction, however preferably by heating, for example, at temperatures of about 150° C. to about 220° C., and especially from about 150° C. to about 180° C., whereby the desired 10-aminoalkyl compound is formed.

Preferred reactive esters of aminoalkanols are the aminoalkyl halides, particularly the tertiary-aminoalkyl halides, e.g. chlorides or bromides, or acid addition salts thereof.

A reactive esterified hydroxyalkyl group $R_0$ is primarily a halogeno-alkyl group, e.g. a chloro- or bromo-alkyl group, or an organic sulfonyloxyalkyl group. It is converted into the desired aminoalkyl group by treatment with ammonia or an agent yielding ammonia, such as hexamethylenetetramine, or a metal amide, e.g. sodamide, but preferably with an at most secondary amine.

A residue $R^0$ capable of being split off in an $R^0$-aminoalkyl group $R_0$ is preferably an acyl group, particularly one which can be split off by hydrolysis. The latter group is especially the acyl residue of a mono-esterified carbonic acid, such as a carbo-lower alkoxy residue, for example, a carbomethoxy, carbethoxy or carbo-tertiary-butyloxy residue, or the carbo-2,2,2-trichloroethoxy residue, as well as the acyl residue of a carboxylic acid, such as formic acid, or a lower alkane carboxylic acid, for example acetic or propionic acid. The acylamino bond in an acylamino-alkyl group $R_0$ is advantageously split by hydrolysis, especially in the presence of an aqueous mineral acid or an aqueous base; a carbo-tertiary-butyl-oxy-amino group may also be split, for example, by treatment with trifluoroacetic acid, the carbo-2,2,2-trichloroethoxyamino group reductively, for example, with a chromium-II salt, such as chromium-II-acetate. A further residue $R^0$ is, for example, a cyano group, which can be split off by hydrolysis, advantageously in the presence of an aqueous mineral acid. The latter modification of the process for making the compounds of the invention is suitable for producing compounds having N-unsubstituted or primarily N-monosubstituted aminoalkyl substituents.

A group $X_0$ is primarily a hydrogen atom, but may also represent an acyl residue, particularly the acyl residue of an organic carboxylic acid, such as the benzoyl or acetyl groups, whereas the group $X_0^a$ stands for a free or more especially a functionally converted carboxyl group, such as an esterified carboxyl group, e.g. a carbo-lower alkoxy group, such as an esterified carboxyl group, e.g. a carbo-lower alkoxy group, such as a carbomethoxy or carbethoxy group, or especially a halogeno carbonyl group, e.g. a chlorocarbonyl group. Ring closure of a starting material containing such a group, which proceeds under the removal of water, as well as of an alcohol, an acid or an ester, and in which $X_0^a$ furnishes under the reaction conditions the carbonyl group in the final products may be carried out by methods in themselves known, for example, by heating, preferably in the presence of an alkaline condensing agent such as, for example, an alkali metal or alkaline earth metal carbonate, hydroxide, amide, hydride or lower alkoxide, as well as an organic alkali metal compound such as phenyl sodium, and preferably in the presence of a diluent.

A group $X_0^a$ capable of being converted into a methylene group is, for example, a reactive esterified hydroxymethyl group, especially a halogenomethyl group, e.g. a chloromethyl group. Ring closure of a starting material containing such a group $X_0^a$ is caried out, for example, by treatment with a basic condensing agent.

The above processes may be carried out in the presence or absence of diluents, at room temperature, while cooling or heating, under atmospheric or superatmospheric pressure, and/or in an atmosphere of an inert gas.

The conversion in a resulting compound of an aminoalkyl substituent into a different aminoalkyl group is carried out in a manner in itself known. Thus, for example, a primary or secondary amino group can be substituted by treatment with a reactive ester of an alcohol, especially a coresponding halide, sulfate or sulfonate, with the formation of a secondary or tertiary amino group, respectively, a primary amino group may also be substituted by treatment with an aldehyde or a ketone and simultaneous or subsequent reduction, for example, with catalytically activated hydrogen or sodium borohydride, with formaldehyde also in the presence of formic acid.

Furthermore, a substituent present in a substituted amino group, especially in a tertiary amino group, particularly an alkyl group and primarily a methyl group may be replaced by hydrogen in a manner in itself known. This can be achieved, for example, oxidatively by treatment with a suitable oxidizing agent, such as potassium permanganate, manganese dioxide, potassium ferricyanide, chromic acid, dibenzoyl peroxide, gold-III-chloride or mercury-II-acetate; in any resulting N-acylamino group, especially N-formylamino group, the acyl group may be subsequently split off by hydrolysis. By treatment with an ester of an azo-dicarboxylic acid, such as diethylazodicarboxylate, a substituent, such as an alkyl residue, especially a methyl group, present in a substituted amino group can be split off and replaced by hydrogen. In a similar manner it is possible to split off from a resulting compound, which contains a tertiary amino group, one of the substituents bound to the amino group, e.g. an alkyl group, especially a methyl group, by forming the N-oxide, for example, with hydrogen peroxide, ozone or a per-acid, such as peracetic, perbonzoic, monoperphthalic or p-toluenepersulfonic acid, and treating the N-oxide, for example, with a suitable oxidizing agent containing, for example, trivalent iron, or with acetic anhydride. Furthermore, by treating a resulting compound having a tertiary-aminoalkyl substituent, in which the disubstituted amino group advantageously contains an alkyl group, especially a methyl group, as substituent, with a cyanogene halide, especially cyanogen bromide, or with a halogenoformic acid ester, such as ethyl, tertiary butyl or benzyl chloroformate or with a carbonic acid dihalide e.g. phosgene, or with a suitable carboxylic acid or anhydride or halide, e.g. chloride, thereof, a substituent, especially an alkyl group, primarily a methyl group, present in the amino group can be replaced by a cyano group, or a functionally converted carboxyl group, such as an esterified carboxyl group, e.g. a carbethoxy, carbo-tertiary-butoxy or carbobenzoxy group, or an acyl group. From a resulting intermediate product a group so introduced can be split off as described above, for example, by treatment with an acid reagent, a cyano group, for example, by means of hydrochloric acid or polyphosphoric acid, and an esterified carboxyl group, for example, by means of hydrobromic acid in acetic acid.

Depending on the reaction conditions the compounds of the invention are obtained in the free form or in the form of salts thereof. As acid addition salts there are especially those suitable for pharmaceutical use, for example, those of inorganic acids, such as hydrochloric acid, hydrobromic acid, sulfuric acid or phosphoric acid, or those of organic acids, such as acetic, oxalic, propionic, pivalic, glycollic, lactic, malonic, succinic, maleic, hydroxy-maleic, malic, tartaric, citric, benzoic, salicylic, 2-acetoxy-benzoic, nicotinic, isonicotinic, ascorbic, methane sulfonic, ethane sulfonic, ethane-1,2-disulfonic, 2-hydroxy-ethane sulfonic, p-toluene sulfonic or naphthalene sulfonic acid. Other acid addition salts can be used as intermediate products or for identification; especially useful for identification purposes are those with organic nitro-compounds, e.g. those of picric, picrolonic or flavianic acid, or of complex metal acids, e.g. phosphotungstic acid, phosphomolybdic acid, chloroplatinic acid or Reinecke acid, or of perchloric acid.

Salts obtained may be converted into the free compounds, for example, by treatment with a base or with a suitable anion exchanger, or converted into other salts by treatment with a metal salt, e.g. a barium or silver salt, in the presence of a diluent in which the resulting inorganic compound is insoluble, or with a suitable anion exchanger. Free compounds are converted into acid addition salts, for example, by treatment with siutable acids or ion exchangers. Owing to the close relationship between the new compounds in the free form and in the form of their salts, the above and subsequent references to the free compounds or the salts are, where the context permits, to be understood as including also the corresponding salts and free compounds, respectively.

When isomeric mixtures are obtained, the racemates may be split up into their isomers in known manner, for example, by converting them into mixtures of diastereoisomeric salts with suitable optically active acids and splitting up the mixture into its components on the basis of differences in solubility.

The invention also includes any modifications of the process in which there is used as starting material a compound obtainable as an intermediate product at any stage of the process and the remaining process steps are carried out, or in which the process may be interrupted at any stage, or in which the starting material is formed under the reaction conditions or the reaction components are present, if desired, in the form of salts thereof.

For carrying out the reactions in accordance with the invention there are preferably used those starting materials that lead to the formation of the compounds stated above to be preferred.

The starting materials used in the process of the invention are either known or, if new, can be made by methods in themselves known. The new compounds are more especially 2-nitro-11-X-10,11 - dihydro - dibenzo-[b,f][1,4]oxazepines and the corresponding 3-nitro- and 7-nitro-11-X-10,11-dihydro-dibenzo[b,f][1,4]oxazepines, particularly the compounds of the Formulae IVa and IVb

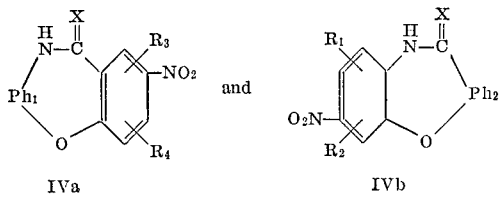

in which $Ph_1$, $Ph_2$, $R_1$, $R_2$, $R_3$, $R_4$ and X have the meanings given above, and primarily compounds of the Formulae Va and Vb

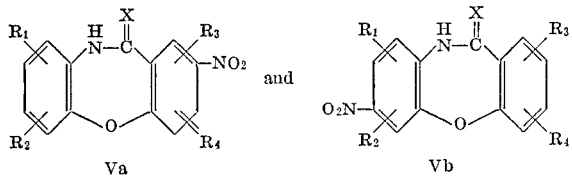

in which X, $R_1$, $R_2$, $R_3$ and $R_4$ have the meanings given above, X preferably representing an oxygen atom and each of the groups $R_1$, $R_2$, $R_3$ and $R_4$ representing two hydrogen atoms.

The compounds used as starting materials can be obtained, for example, (c) By subjecting to ring closure an o-(N-$X_0$-amino)-o'-$X_0^a$-diphenyl ether, in which at least one of the aromatic residues contains a nitro group, and $X_0$ and $X_0^a$ have the previously given meaning, or (d) By bringing about ring closure to form the 4,5-dihydro-1,4-oxazepine ring in an N-(o-hydroxy-phenyl)-o-$X_0^b$-benzoic acid amide or in an N-(o-hydroxy-phenyl)-N-(o-$X_0^b$-benzyl)-amine, in which at least one of the aromatic residues contains a nitro group and $X_0^b$ is a reactive esterified hydroxyl group, or a salt thereof, or (e) By subjecting to ring closure an o-(N-$X_0^c$-amino)-diphenyl ether, in which at least one of the aromatic residues contains nitro group and $X_0^c$ is a substituent capable of forming under the conditions of ring closure a carbonyl or methylene group, and in which at least one of the o'-positions is unsubstituted, or (f) By introducing a nitro group into a 11-X-10,11-dihydrodibenzo[b,f][1,4]oxazepine, or (g) By subjecting a 9-hydroximino-xanthene, in which at least one of the two carbocyclic aromatic rings contains a nitro group, to the Beckmann rearrangement, or Ring-closure according to procedure (c) is carried out as described under the method (b).

The ring closure of a starting material, in which $X_0^b$ is primarily a halogen atom, e.g. a chlorine or bromine atom, according to (d) is carried out, for example, by treatment with a base, such as an alkali metal hydroxide, e.g. sodium hydroxide or potassium hydroxide, especially a solution thereof, for example, in water, and, when necessary, at a raised temperature, or by heating a salt, e.g. an alkali metal salt such as the sodium salt, of the starting material, preferably in the presence of a suitable solvent, such as dimethylformamide.

A group $X_0^c$ in a starting material is a functionally converted carboxyl group, especially an esterified carboxyl group, such as a carbo-lower alkoxy group, but may be a carbonyl group which forms with the amino group an isocyanato residue. The ring closure according to (e) is carried out, for example, in the presence of an acid condensing agent, such as polyphosphoric acid or sulfuric acid, and in the case of an isocyanato group it may also be carried out in the presence of aluminum chloride.

The introduction of a nitro group according to (f) is carried out by any suitable nitrating process that is capable of introducing a nitro group into an aromatic nucleus, for example, nitric acid in the presence of sulfuric acid.

The Beckmann rearrangement method (g) is carried out in a manner in itself known, preferably by treating the 9-hydroximino-xanthene, for example, with a phosphorus halide, such as phosphorus pentachloride. In this manner two isomeric 10,11-dihydro-dibenzo[b,f][1,4]-oxazepines can be obtained.

The nitrogen-to-carbon double bond in the starting material used in method (h) can be saturated, for example, by treatment with a suitable hydride reducing agent that does not reduce a nitro group, such as an alkali borohydride, e.g. sodium borohydride.

A group $R_0$ other than hydrogen is introduced in a manner in itself known. Thus, a reactive esterified hydroxyalkyl residue is introduced, for example, by treatment with a halogeno-alkanol or an alkylene oxide as well as an alkylene halide and, if necessary, esterifying the free hydroxyl group in the resulting intermediate product, for example, with a suitable halogenating agent, such as thionyl chloride, or with a sulfonic acid halide, such as p-toluene sulfonic acid chloride; and an acylaminoalkyl group is introduced, for example, by treating the N-unsubstituted 10,11-dihydro - dibenzo[b,f][1,4]oxazepine or a salt thereof with an acylaminoalkyl halide.

The compounds used in the above processes for making the starting materials are either know or can be made by methods in themselves known. Those used in method (c) can be obtained, for example, be reacting an o-(N-$X_0$-amino)-phenol with an o-halogen-benzoic acid, at least one of the reaction components containing an aromatically bound nitro group; in the resulting intermediate product the free corbonxyl groups can be converted into the desired groups $X_0^a$ in a manner in itself known. The compounds used in the method (d) are obtained, for example, by reacting an o-amino-phenol with an o-$X_0^b$-benzoic acid halide, especially a chloride, at least one of the two compounds contains an aromatically bound nitro group.

Compounds that may be used in method (e) are obtained, for example, by reacting an o-aminodiphenyl ether, in which at least one of the two aromatic residues contains a nitro group, with a suitable halogeno-carbonic acid compound, such as ethyl chloro-formate.

The 9-hydroximino-xanthene compounds used in method (g), which are suitable for preparing 11-oxo-10,11-dihydrodibenzo[b,f][1,4]oxazepines, are obtained, for example, by treating a xanthone or 9-thiono-xanthene containing in at least one of the two aromatic rings a nitro group, with hydroxylamine or a salt thereof, the latter being used in the presence of a base, such as pyridine.

The compounds used in method (f) are obtained for example, by treating an o-aminophenol with an o-halogeno-benzaldehyde, at least one of the two starting materials, preferably the o-halogeno-benzaldehyde, containing an aromatically bound nitro group, and subsequently ring closing a resulting N-(o-halogen-benzal)-o-aminophenol, for example, by treatment with a suitable base, or by heating a salt thereof in a suitable solvent. This method is especially suitable for making 11-unsubstituted 10,11-dihydro-dibenzo[b,f][1,4]oxazepine starting materials.

The starting materials used for process modification (b) are prepared, for example, by introducing into the amino group of an o-(N-$X_0$-amino)-o'-$X_0^a$-diphenyl ether, in which at least one of the phenyl residues carries a nitro group (prepared, for example, according to the previously described procedure and also used, for example, in the ring closure according to method (c) in the manufacture of the starting material according to (a)), the aminoalkyl substituent, for example, according to the previously described method; a resulting starting material product may not have to be isolated but may ring-close under the reaction conditions to directly furnish the desired final product; ring-closure may be accelerated by heating and/or addition of a condensing reagent, such as an alkali metal or an alkali metal hydride or amide or an organic alkali metal compound, such as phenyl sodium.

The compounds of the invention can be used, for example, in the form of pharmaceutical preparations that are suitable for enternal, e.g. oral, or parenteral administration; these preparations contain the new compounds in admixture or conjunction with a pharmaceutically suitable organic or inorganic, solid or liquid carrier. The preparations may be in solid form, e.g. as capsules, tablets, dragees or suppositories, or in liquid form, e.g. as solutions or suspensions. Suitable carriers are, for example, starches, such as maize, wheat or rice starch, sugars, such as lactose, glucose or sucrose, or stearic acid or salts thereof, such as magnesium sterate or calcium stearate, stearyl alcohol, talc, gums, tragacanth, water, propylene glycol or polyalkylene glycols. The quantity or nature of the carrier may vary very widely and depends, for example, on the properties or size of the preparation and also on its method of production. If necessary, the preparations may also contain other auxiliary substances, such as preserving, stabilizing, wetting or emulsifying agents, solubilizers, salts for regulating the osmotic pressure, or buffers. They may also contain other therapeutically useful substances and their manufacture is carried out by methods in themselves known, for example, by preparing a mixture, a granulate or a solution.

The following examples illustrate the invention, the temperature being in degrees centigrade:

Example 1

A mixture of 3 g. of 2-nitro-11-oxo-10,11-dihydro-dibenzo[b,f][1,4]oxazepine and 4.7 g. of 3-dimethylaminopropylchloride hydrochloride in 18 ml. of water containing 1.8 g. of sodium hydroxide and 30 ml. of acetone is heated under reflux for 5 hours. The acetone is then removed under reduced pressure and water is added to the residue. On cooling, an oil separates, which is extracted into ether. The ether layer containing the 10-(3-dimethylaminopropyl) - 2 - nitro-11-oxo-10,11-dihydro-dibenzo[b,f][1,4]oxazepine is washed with water and then shaken with concentrated hydrochloric acid, whereupon the hydrochloride of the product separates. The mixture is filtered and the residue washed with ether and hydrochloric acid. Its recrystallization from absolute ethanol yields the 10-(3-dimethylaminopropyl) - 2 - nitro-11-oxo-10,11-dihydro-dibenzo[b,f][1,4]oxazepine hydrochloride of the formula

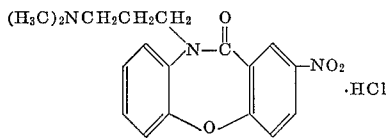

melting at 223–226°.

The starting material used in the above reaction is prepared as follows:

A mixture of a solution of 5.2 g. of sodium bicarbonate in 50 ml. of water and a solution of 3.3 g. of o-aminophenol in 50 ml. of ether is cooled with ice water and while stirring, treated gradually with a solution of 6.6 g. of 2-chloro-5-nitrobenzoyl chloride in 50 ml. of dry ether over a period of 1 hour. The mixture is stirred for several hours and then filtered to give the crystalline amide. The ether layer of the filtrate is separated and shaken with dilute hydrochloric acid, and then with water, dried and evaporated to give more of the amide. Recrystallization from aqueous methanol affords the N-(2-chloro-5-nitrobenzoyl)-2-hydroxy-aniline, melting at 189–192°.

A solution of 4.5 g. of N-2-chloro-5-nitrobenzoyl-2-hydroxyaniline in 150 ml. water containing 0.8 g. of sodium hydroxide is heated with stirring on the steam bath for 16 hours. The crystalline precipitate is filtered off, washed with water and recrystallized from acetone-methanol to afford the 2-nitro-11-oxo-10,11-dihydro-dibenzo[b,f][1,4]oxazepine of the formula

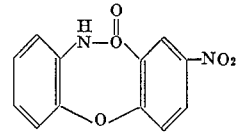

melting at 258–260°.

The above starting material may also be obtained as follows:

A mixture of 8.5 g. of 2-nitro-xanthone and 13.8 g. of hydroxylamine hydrochloride is suspended in 150 ml. of dry pyridine and heated under reflux with stirring for 75 hours. The pyridine is removed by distillation under reduced pressure and the residue is triturated with cold water, and filtered off; the solid material is washed several times with water, dilute hydrochloric acid, again with water and finally with a small amount of chloroform. After two crystallizations from chloroform, the 9-hydroxyimino-2-nitro-xanthene melts at 210–211°.

A mixture of 1 g. of 9-hydroxyimino-2-nitro-xanthene in 150 ml. of dry ether is stirred for several days with 5 g. of phosphorus pentachloride. The mixture is treated with water and filtered. The ether layer is evaporated to dryness and the residue is digested with diluted aqueous sodium hydroxide, filtered and washed with water. Repeated crystallizations from a mixture of acetone and methanol affords the 2-nitro-11-oxo-10,11-dihydro-dibenzo[b,f][1,4]oxazepine, M.P. 245–250; the product is identical with the one obtained according to the above procedure (mixed melting point, thin layer chromatography).

The starting material can also be obtained as follows:

To a suspension of 0.7 g. of anhydrous aluminum chloride in 10 ml. of o-dichlorobenzene at 100° (oilbath temperature) is added over a period of 10 minutes and while stirring a solution of 1.25 g. of 2-isocyanato-4'-nitro-diphenylether in 5 ml. of o-dichlorobenzene. The mixture is heated gradually to 150° (oil bath) and held at this temperature with stirring for 1 hour. After cooling, it is decomposed with ice-cold dilute hydrochloric acid and extracted with chloroform; the mixture is filtered to remove some insoluble material. The chloroform layer is separated, dried and concentrated to a small volume. After diluting it with n-hexane, a precipitate is formed which is filtered, washed with a small amount of methanol, and crystallised from a mixture of acetone and methanol, using activated charcoal; the resulting 2-nitro-11-oxo-10,11-dihydro-dibenzo[b,f][1,4]oxazepine melts at 260–261.5° and is identical with the product obtained according to the above procedures.

By the same procedure are prepared from 2-nitro-11-oxo-10,11-dihydro-dibenzo[b,f][1,4]oxazepine using the appropriate aminoalkyl halide the following compounds: 2-nitro-11-oxo-10-(2 - piperidinoethyl) - 10,11 - dihydrodibenzo[b,f][1,4]oxazepine, the hydrochloride of which melts at 235–238°; 10-(2-dimethylaminoethyl)-2-nitro-11-oxo-10,11-dihydro-dibenzo[b,f][1,4]oxazepine, the hydrochloride of which melts at 250–252°; 10-(2-diethylaminoethyl)-2-nitro-11-oxo - 10,11 - dihydro-dibenzo[b,f][1,4]oxazepine, the hydrochloride of which melts at 181–184°; and the 10-(2-dimethylaminopropyl)-2-nitro-11- oxo-10,11-dihydro-dibenzo[b,f][1,4]oxazepine, the hydrochloride of which melts at 239–241°.

Example 2

A solution of 2.56 g. of 10-(3-dimethylaminopropyl)-2-nitro-11-oxo-10,11-dihydro - dibenzo[b,f][1,4]oxazepine in 5 ml. of absolute ethanol is warmed on a water bath in the presence of 1.86 g. of oxalic acid dihydrate. The mixture is then filtered after cooling and the residue is washed with a small amount of ethanol and ether. Recrystallisation from aqueous methanol yields the oxalate of 10-(2-dimethylaminopropyl)-2-nitro - 11 - oxo - 10,11-dihydro-dibenzo[b,f][1,4]oxazepine, M.P. 212–214° (with decomposition).

Example 3

A solution of 2.56 g. of 10-(3-dimethylaminopropyl)-2-nitro-11-oxo-10,11-dihydro - dibenzo[b,f][1,4]oxazepine in 5 ml. of absolute ethanol is warmed on a water bath with 1.7 g. maleic acid. The mixture is cooled and then filtered; the solid material is recrystallised from a mixture of methanol and ether to yield the 10-(3-dimethylaminopropyl)-2-nitro-11-oxo-10,11-dihydro - dibenzo[b,f][1,4]oxazepine maleate, M.P. 166–168°.

Example 4

A mixture of 5.8 g. of 8-chloro-2-nitro-11-oxo-10,11-dihydro-dibenzo[b,f][1,4]oxazepine and 12.56 g. of 3-dimethylaminopropyl chloride hydrochloride in 60 ml. of water containing 5.2 g. of sodium hydroxide and 140 ml. of acetone is heated under reflux with stirring for several hours. The acetone is then removed under reduced pressure and water is added to the residue. On cooling, an oil separates which is extracted into ether. The ether layer containing the 8-chloro-10-(3-dimethylaminopropyl)-2-nitro-11-oxo-10,11-dihydro - dibenzo[b,f][1,4]oxazepine is washed with water, dried over sodium sulfate, and then saturated with dry hydrogen chloride gas, whereupon a precipitate separates which is filtered off. Upon recrystallisation from a mixture of methanol and ether one obtains the 8-chloro-10-(3-dimethylaminopropyl)-2-nitro-11-oxo-10,11-dihydro-dibenzo[b,f][1,4]oxazepine hydrochloride of the formula

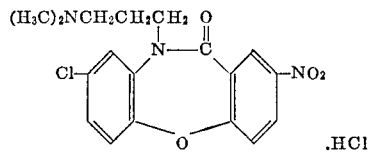

as the hemihydrate and melts at 198–199°.

The 8 - chloro - 2 - nitro-11-oxo-10,11-dihydro-dibenzo[b,f][1,4]oxazepine, M.P. above 320°, used as the starting material is prepared according to the procedure described in Example 1, using the 5-chloro-N-(2-chloro-5-nitrobenzoyl)-2-hydroxyaniline, M.P. 221–222°, as the intermediate.

Example 5

A mixture of 5.4 g. of 8-methyl-2-nitro-11-oxo-10,11-dihydro-dibenzo[b,f][1,4]oxazepine and 9.5 g. of 3-dimethylaminopropyl chloride hydrochloride in 50 ml. of water containing 3.6 g. of sodium hydroxide and 100 ml. of acetone is heated under reflux for 6 hours. The acetone is then removed under reduced pressure and water is added to the residue. On cooling, an oil separates which is extracted into ether. The ether layer containing the 10-(3-dimethylaminopropyl) - 8 - methyl-2-nitro-11-oxo-10,11-dihydro-dibenzo[b,f][1,4]oxazepine is washed with water, dried over anhydrous sodium sulfate, concentrated and saturated with dry hydrogen chloride gas. The resulting precipitate is filtered off and recrystallised from a mixture of absolute ethanol and ether to afford the 10-(3-dimethylaminopropyl) - 8 - methyl-2-nitro-11-oxo-10,11-dihydro-dibenzo[b,f][1,4]oxazepine hydrochloride of the formula

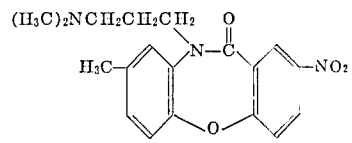

which melts at 125–127°.

The starting material is prepared as follows:

p-Toluidine is converted to the 4-hydroxy-3-nitro-toluene according to a known method [Ber. 68, 260(1935)]. The nitro compound is hydrogenated at room temperature and at 1 atmosphere pressure in the presence of platinum oxide to the desired 3-amino-4-hydroxy-toluene used as the intermediate.

A mixture of a solution of 8.5 g. sodium hydrogen carbonate in 50 ml of water and a solution of 6 g. of 3-amino-4-hydroxy-toluene in 50 ml. ether is cooled with ice water and, while stirring, treated over a period of 1 hour with a solution of 11 g. of 2-chloro-5-nitro-benzoyl-chloride in 50 ml. dry ether. The mixture is stirred for 4 hours at room temperature and then worked up for the neutral part as described in Example 1.

The crude N-(2-chloro-5-nitro-benzoyl)-2-hydroxy-5-methyl-aniline thus obtained has a melting point 200° and is used as such in the cyclisation reaction.

A solution of 52 g. of N-(2-chloro-5-nitro-benzoyl)-2-hydroxy-5-methyl-aniline in 500 ml. of water containing 9.2 g. of sodium hydroxide is heated with stirring on the water bath at 90° for 19 hours. The mixture is diluted with water and cooled; the crystalline precipitate is filtered off, washed with water and recrystallized from a mixture of dimethylformamide and absolute ethanol to yield the 8 - methyl - 2 - nitro - 11 - oxo - 10,11 - dihydro-dibenzo[b,f][1,4]oxazepine, M.P. 326–327°.

Example 6

Upon treatment of 2,8-dinitro-11-oxo-10,11-dihydro-dibenzo[b,f][1,4]oxazepine with 3-dimethylaminopropyl chloride hydrochloride in the presence of an alkaline reagent such as sodium hydroxide according to the above described and illustrated procedure using amounts equivalent to those used in Examples 1, 4 or 5 one obtains the 10 - (3 - dimethylaminopropyl)-2,8-dinitro-11-oxo-10,11-dihydro-dibenzo[b,f][1,4]oxazepine of the formula

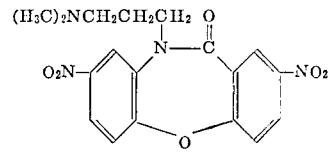

which is characterized in the form of an acid addition salt, such as the hydrochloride.

According to the above procedure one may also obtain the following compounds:

10-(3 - dimethylaminopropyl)-2,7 - dinitro-11-oxo-10,11-dihydro-dibenzo[b,f][1,4]oxazepine;

8 - acetyl-10-(3-dimethylaminopropyl)-2-nitro-11-oxo-10, 11-dihydro-dibenzo[b,f][1,4]oxazepine; and 10-(3 - dimethylaminopropyl)-2-nitro-6,8,9-trichloro-11-oxo-10,11dihydro-dibenzo[b,f][1,4]oxazepine.

The starting material is prepared as described before by treatment of an ether solution of 9.2 g. of 2-amino-4-nitrophenol with an ether solution of 13.2 g. of 2-chloro-5-nitrobenzoyl chloride in the presence of an aqueous solution of 11.0 g. of sodium bicarbonate. Crystallized from acetone-ethanol, the N-(2-chloro-5-nitro-benzoyl)-2-hydroxy-5-nitro-aniline melts at 239–244°.

A solution of 20 g. of N-(2-chloro-5-nitro-benzoyl)-2-hydroxy-5-nitro-aniline in 60 ml. of 1 N aqueous sodium hydroxide is evaporated to dryness. After removal of the last traces of moisture by azeotropic distillation with benzene, the dry sodium salt is suspended in 150 ml. dimethylformamide and heated under reflux for 2 hours; a crystalline precipitate separates during this operation. After cooling, water is added to the mixture, which is then filtered. The precipitate is further washed with water and recrystallized from dimethyl formamide-ethanol to afford the 2,8 - dinitro - 11 - oxo - 10,11 - dihydrodibenzo[b,f][1,4]oxazepine melting above 330°.

By the above procedure are also prepared the following starting materials:

2,7 - dinitro - 11-oxo-10,11-dihydro-dibenzo[b,f][1,4] oxazepine, M.P. 285–290°, using N-(2-chloro-5-nitrobenzoyl)-2-hydroxy-4-nitro-aniline, M.P. 201–204° as the intermediate; 8 - acetyl - 2 - nitro-11-oxo-10,11-dinitro-dibenzo[b,f][1,4]oxazepine, M.P. above 330°, using N-(2-chloro - 5-nitrobenzoyl)-2-hydroxy-5-acetyl-aniline, M.P. 230–231°, as the intermediate; and 2-nitro-6,8,9-trichloro-11 - oxo-10,11-dihydro-dibenzo[b,f][1,4]oxazepine, M.P. 320–322°, using N-(2-chloro-5-nitrobenzoyl)-2-hydroxy-3,5,6-trichloroaniline, M.P. 199–202°, as the intermediate.

Example 7

A suspension of 3 g. of 10-(3-N-cyano-N-methylamino - propyl) - 2 - nitro-11-oxo-10,11-dihydro-dibenzo [b,f][1,4]oxazepine in 75 ml. of approximately 4 N hydrochloric acid is heated under reflux for 4 hours. After cooling, the reaction mixture is shaken with ether and the layers separated; the aqueous layer is basified with liquid ammonia and extracted with methylene chloride. The methylene chloride extract containing the 10-(3-methylaminopropyl) - 2 - nitro - 11-oxo-10,11-dihydro-dibenzo [b,f][1,4]oxazepine is washed with water, dried and then concentrated to a small volume. The hydrochloride salt is prepared by saturating the concentrated methylene chloride solution with dry hydrogen chloride gas; the resulting solid is filtered off and crystallized from a mixture of absolute ethanol and ether; the 10-(3-methylaminopropyl)-2 - nitro - 11-oxo-10,11-dihydro-dibenzo[b,f][1,4]oxazepine hydrochloride of the formula

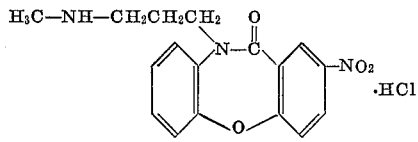

melts at 215–217°.

The starting material used in the above procedure is prepared as follows:

A solution of 2.1 g. of cyanogen bromide in 15 ml. of dry ether is added dropwise during 15 minutes and while stirring to a solution of 5.6 g. of 10-(3-dimethylaminopropyl) - 2-nitro-11-oxo-10,11-dihydro-dibenzo[b,f][1,4] oxazepine in 25 ml. of dry ether. The mixture is stirred for 4 hours at room temperature, and treated with 25 ml. of water; the solid material is filtered off representing the crystalline 10 - (3 - N-cyano-N-methyl-aminopropyl)-2-nitro - 11-oxo-10,11-dihydro-dibenzo[b,f][1,4]oxazepine. The ether layer of the filtrate is separated and shaken with dilute hydrochloric acid and with water, dried and evaporated to yield an additional small amount of the desired compound. After recrystallization from a mixture of chloroform and n-hexane, the product melts at 135–136°.

Example 8

A mixture of 2 g. of 10-(3-N-cyano-N-methyl-aminopropyl) - 2-nitro-11-oxo-10,11-dihydro-dibenzo[b,f][1,4] oxazepine and 25 g. of polyphosphoric acid is heated while stirring for 30 minutes at 140° (oil bath); the temperature is then elevated to 160° and kept for nearly 3 hours. After cooling, the mixture is diluted with ice-cold water, 25 ml. of 3 N hydrochloric acid is added and the mixture is shaken with methylene chloride. The aqueous acidic layer is basified with liquid ammonia and the separated oil is extracted into methylene chloride; the organic solution is washed with water, dried over sodium sulfate and then saturated with dry hydrogen chloride gas. The hydrochloride salt of 10-(3-methylaminopropyl)-2-nitro-11-oxo-10,11-dihydro-dibenzo[b,f][1,4]oxazepine is filtered off, washed with a small amount of a mixture of absolute ethanol and ether and is then crystallised from a mixture of ethanol and ether, M.P. 215–217°.

Example 9

A mixture of 1.4 g. of 10-(3-N-carbethoxy-N-methylaminopropyl) - 2 - nitro - 11-oxo-10,11-dihydro-dibenzo [b,f][1,4]oxazepine and 12 ml. of 48% hydrogen-bromide in acetic acid is allowed to stand while protected from moisture at room temperature for 3 days with occasional shaking. 100 ml. of ether is added to the mixture, cooled and decanted off. The sticky solid residue is shaken with 100 ml. of warm water and filtered. The filtrate is basified with liquid ammonia and extracted with methylene chloride; the organic solution is washed with water, dried and then saturated with dry hydrogen chloride gas. The desired 10-(3-methylaminopropyl)-2-nitro-11-oxo-10,11-dihydro-dibenzo[b,f][1,4]oxazepine hydrochloride separates as a crystalline solid, and is recrystallized from a mixture of ethanol and ether, M.P. 215–217°.

The starting material is prepared as follows:

To a solution of 3.4 g. of 10-(3-dimethylaminopropyl)-2 - nitro - 11-oxo-10,11-dihydro-dibenzo[b,f][1,4]oxazepine in 20 ml. of dry xylene is added over a period of 10 minutes and while stirring a solution of 4.3 g. of ethyl chloroformate in 5 ml. of dry xylene. The mixture is heated under reflux with stirring for 6 hours; after cooling, it is shaken with 50 ml. of ether and 25 ml. of dilute hydrochloric acid and the layers are separated. The organic layer is evaporated to dryness under reduced pressure, and the oily residue, representing the 10-(3-N-carbethoxy - N - methyl-aminopropyl)-2-nitro-11-oxo-10, 11-dihydro-dibenzo[b,f][1,4]oxazepine is used without further purification.

Example 10

A solution of 4.6 g. of 10-(3-N-formyl-N-methylaminopropyl) - 2-nitro-11-oxo-10,11-dihydro-dibenzo[b,f] [1,4]oxazepine in 70 ml. of ethanol is mixed with 30 ml. of 6 N hydrochloric acid and heated under reflux for 6 hours. The 10-(3-methyl-aminopropyl)-2-nitro-11-oxo-10,11-dihydro-dibenzo[b,f][1,4]oxazepine hydrochloride crystallises upon cooling in ice and is filtered off, washed with a small amount of a mixture of ethanol and ether. The aqueous layer of the filtrate is basified with liquid ammonia and extracted with methylene chloride; the organic extract is dried over anhydrous sodium sulfate and saturated with dry hydrogen chloride gas to yield an additional amount of the desired product, which upon recrystallization from a mixture of absolute ethanol and ether melts at 215–217°.

The starting material is prepared as follows:

A suspension of 1 g. of powdered sodium amide in 25 ml. of dry dioxane is treated with a warm solution of 5.1 g. of 2-nitro-11-oxo-10,11-dihydro-dibenzo[b,f][1,4] oxazepine in 125 ml. of dry dioxane; the mixture is stirred for ½ hour and then treated over a period of 10 minutes with 3.4 g. of 3-N-formyl-N-methylamino-propyl chloride [prepared by the reaction of N-methyl-formamide and 3-bromo-1-chloropropane in the presence of sodium amide according to the method described in Chem. Abstr. 62, 13163e (1965)]. After heating under reflux for 6 hours while stirring, the solvent is removed by distillation under reduced pressure and the residue is shaken with water and methylene chloride and filtered to remove the unreacted starting material. The methylene chloride layer of the filtrate is washed with water, dried and evaporated to dryness under reduced pressure to yield the 10-(3-N-formyl - N - methyl-aminopropyl)-2-nitro-11-oxo-10,11-dihydro-dibenzo[b,f][1,4]oxazepine as a brown oil, which is used without further purification.

Example 11

A suspension of 2.55 g. of 3-nitro-11-oxo-10,11-dihydrodibenzo[b,f][1,4]oxazepine in 150 ml. of acetone is warmed on a water bath (70°) for 10 minutes; 4.5 ml. of a 2.28 N aqueous sodium hydroxide solution is then added and the mixture stirred to give a clear solution. Another 4.5 ml. of 2.28 N aqueous sodium hydroxide solution is added, followed by 1.5 g. of 3-dimethylaminopropyl chloride hydrochloride. The mixture is heated under reflux (water bath at 80–85°) for 1 hour while stirring. The addition of 4.5 ml. of the aqueous sodium hydroxide and 1.5 g. of the 3-dimethylaminopropyl chloride hydrochloride followed by refluxing for one hour is repeated twice more. Finally the mixture is heated under reflux for 3½ hours and the acetone is removed under reduced pressure. Water is added to the residue and on cooling, an oil containing the 10-(3-dimethylaminopropyl)-3-nitro-11-oxo-10,11-dihydro-dibenzo[b,f][1,4]oxazepine of the formula

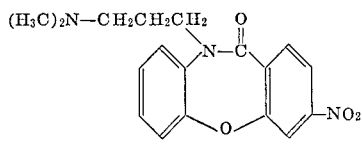

separates and is partitioned between ether and dilute hydrochloric acid. The aqueous acidic solution is basified with liquid ammonia and extracted with ether; the organic layer is separated, washed with water, dried over anhydrous sodium sulfate and then saturated with dry hydrogen chloride gas. The precipitate is filtered off and crystallized twice (after decolorization) from a mixture of ethanol and ether and then from ethanol to give the 10-(3 - dimethylaminopropyl) - 3 - nitro - 11 - oxo - 10,11-dihydro - dibenzo[b,f][1,4]oxazepine hydrochloride, M.P. 246–249°.

According to the above procedure one also obtains by selecting the appropriate starting material the 10-(3-dimethylaminopropyl) - 7 - methoxy - 2 - nitro - 11 - oxo-10,11 - dihydro - dibenzo[b,f][1,4]oxazepine, which is characterized in the form of an acid addition salt, such as the hydrochloride.

The starting material used in the above procedure is prepared as follows:

N - (2 - chloro - 4 - nitro - benzoyl) - 2 - hydroxy-aniline is prepared according to the method described in Example 1 by treatment of an ether solution of 5.5 g. 2-aminophenol with an ether solution of 10 g. of 2-chloro-4-nitro-benzoyl chloride in the presence of an aqueous solution of 8.4 g. of sodium hydrogen carbonate. Crystallised from methanol, the N-(2-chloro-4-nitro-benzoyl)-2-hydroxy-aniline melts at 199–200°.

A solution of 10.5 g. of N-(2-chloro-4-nitro-benzoyl)-2-hydroxy-aniline in 15 ml. of an approximately 2.3 N aqueous sodium hydroxide is evaporated to dryness. After removal of the last traces of moisture by azeotropic distillation with benzene, the dry sodium salt is suspended in 100 ml. of dimethylformamide and heated under reflux for 20 minutes. After cooling, water is added to the mixture, which is then filtered. The precipitate is washed with water and recrystallized from a mixture of dimethylformamide and ethanol or afford the 3-nitro-11-oxo-10,11-dihydro-dibenzo[b,f][1,4]oxazepine, M.P. 295–297°.

By the above procedure is also prepared the 7-methoxy-2 - nitro - 11 - oxo - 10,11 - dihydro - dibenzo[b,f][1,4]-oxazepine, M.P. 292–294° after recrystallization from a mixture of dimethylformamide and ethanol, using N-(2-chloro - 5 - nitro - benzoyl) - 2 - hydroxy - 4 - methoxy-aniline, M.P. 195–197° after recrystallization from ethanol as the intermediate.

Example 12

Upon treatment of 10-(3-chloropropyl)-2-nitro-11-oxo-10,11 - dihydro - dibenzo[b,f][1,4]oxazepine with dimethylamine in a closed vessel, the 10-(3-dimethylaminopropyl) - 2 - nitro - 11 - oxo - 10,11 - dihydro - dibenzo-[b,f][1,4]oxazepine is formed, which melts as the hydrochloride at 223–224° after recrystallization from absolute ethanol.

The starting material used in the above procedure is prepared as follows:

A suspension of 21 g. of anhydrous potassium carbonate in 350 ml. of warm acetone containing 10.3 g. of 2 - nitro - 11 - oxo - 10,11 - dibenzo[b,f][1,4]oxazepine is treated while stirring with 14 g. of 3-bromo-propanol; the mixture is heated under reflux with stirring for 4 hours. After cooling, the inorganic salts are filtered off, the acetone is evaporated from the filtrate and the residue is taken up in 50 ml. of ether, thoroughly cooled and filtered off to remove the unreacted starting material. The ether from the filtrate is evaporated and the unreacted 3-bromopropanol is distilled off under reduced pressure at 50–60°/3 mm. Hg. The oily residue is dissolved in 100 ml. of dry benzene and the solution is treated with 20 ml. of thionyl chloride while cooling and shaking. During this operation a vigorous reaction takes place followed by evolution of hydrogen chloride. After 15 minutes, the mixture is heated under reflux for 3 hours, and the unreacted thionyl chloride and the benzene are then removed under reduced pressure. A chloroform solution of the residue is decolorised with activated charcoal, the solution is evaporated to dryness and the resulting oil is extracted with ether. The clear solution is decanted on concentration and cooling gives the desired 10-(3-chloropropyl)-2-nitro - 11 - oxo - 10,11 - dihydro - dibenzo[b,f][1,4]oxazepine, M.P. 105–107°.

Example 13

Upon treating 11 - oxo - 2,7,9 - trinitro - 10,11 - dihydro[b,f][1,4]oxazepine with 3 - dimethylaminopropyl chloride hydrochloride in the presence of an alkaline reagent, such as sodium hydroxide according to the previously described procedure using amounts about equivalent to those employed in examples 1, 4 or 5, the 10-(3-dimethylaminopropyl) - 11 - oxo - 2,7,9 - trinitro - 10,11-dihydro-benzo[b,f][1,4]oxazepine of the formula

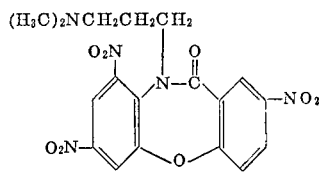

is obtained, which is characterized in the form of an acid addition salt, such as the hydrochloride.

The starting material is prepared as follows:

To 5 g. of 2-nitro-11-oxo-10,11-dihydro-dibenzo[b,f] [1,4]oxazepine is added an ice-cold mixture of 50 ml. of concentrated nitric acid and 50 ml. of concentrated sulfuric acid. The resulting mixture is warmed at 60–70°, till a dark yellow solution is obtained. After being kept at room temperature for ½ hours, the solution is poured into an excess of water. The light yellow solid is filtered off and crystallized from a mixture of acetone and ethanol to yield a dinitro-2-nitro-11-oxo-10,11-dihydro-dibenzo [b,f][1,4]oxazepine, probably the 11-oxo-2,7,9-trinitro-10,11 - dihydro - dibenzo[b,f][1,4]oxazepine, M.P. 232–235° (decomp.).

Example 14

Using 7 - nitro-11-oxo-10,11-dihydro-dibenzo[b,f][1,4] oxazepine and 3-dimethylaminopropyl chloride hydrochloride in amounts about equivalent to those employed in Examples 1, 4 or 5 and reacting them in the presence of an alkaline reagent, such as sodium hydroxide according to the above described procedure one obtains the 10-

(3 - dimethylaminopropyl) - 7 - nitro - 11 - oxo - 10,11 - dihydro-dibenzo[b,f][1,4]oxazepine of the formula $$(H_3C)_2NCH_2CH_2CH_2$$

which is converted into its hydrochloride, M.P. 198–200° after recrystallization from a mixture of ethanol, ethyl acetate and ether.

The starting material used in the above procedure is prepared as follows:

1 g. of 11-oxo-10,11-dihydro-dibenzo[b,f][1,4]oxazepine is added while stirring in small portions during 10 minutes to 10 ml. of concentrated nitricacid, preheated to 60°; a clear solution forms which turns turbid after 5 minutes. The mixture is kept under stirring at 60° for 10 additional minutes and at room temperature for 30 minutes and is then diluted with 25 ml. of ice-cold water. The precipitate is filtered off and recrystallized from a mixture of dimethylformamide and ethanol to yield the 7-nitro-11-oxo-10,11-dihydro-dibenzo[b,f][1,4]oxazepine, M.P. 315–318°.

Example 15

Tablets containing 0.025 g. of the pharmacoligically active compound are prepared as follows:

Ingredients (for 1000 tablets):                              G.
  10 - (3-dimethylaminopropyl) - 2 - nitro - 11 -
    oxo - 10,11 - dihydro - dibenzo[b,f][1,4]oxa-
    zepine hydrochloride _____   25
  Corn starch _____ 155
  Talc _____  14
  Magnesium stearate _____    6
  Water, distilled, q.s.

The 10 - (3-dimethylaminopropyl) - 2 - nitro - 11 - oxo - 10,11 - dihydro - dibenzo[b,f][1,4]oxazepine hydrochloride is mixed intimately with 125 grams of the corn starch. A paste prepared from 30 g. of corn starch and 100 g. of distilled water is added to the above mixture. The mass is well kneaded, granulated and dried at 45°. A mixture of the talc and the magnesium stearate is added to the above granules and mixed well and the granulate is then compressed into tablets of 0.2 g. weight.

Tablets containing 0.05 g. of the active compound are obtained by compressing the above granulate into tablets of 0.4 g. weight.

Tablets containing 0.025 g. of the pharmacologically active compound are prepared as follows:

Ingredients (for 5000 tablets):                              G.
  10 - (3-methylaminopropyl) - 2 - nitro-11-oxo-
    10,11 - dihydro - dibenzo[b,f][1,4]oxazepine
    hydrochloride _____ 125
  Corn starch _____ 775
  Talc _____  70
  Magnesium stearate _____   30
  Water, distilled, q.s.

The tablets are prepared according to the above procedure.

What is claimed is:

1. A member selected from the group consisting of compounds of the formula $$\begin{array}{c} Am-A \quad X \\ | \quad \| \\ N-C \\ Ph_1 \quad Ph_2 \\ O \end{array}$$

in which each of the groups $Ph_1$ and $Ph_2$ is a 1,2-phenylene selected from the group consisting of unsubstituted 1,2-phenylene and 1,2-phenylene substituted by a member selected from the group consisting of lower alkyl, lower alkoxy, trifluoromethyl, nitro, amino, halogeno, and lower alkanoyl, at least one of the groups $Ph_1$ and $Ph_2$ being substituted by nitro, Am is a member selected from the group consisting of lower alkylamino, di-lower alkylamino, alkyleneimino with 4-6 carbon atoms in the alkylene portion, piperazino, 4-lower alkyl-piperazino, morpholino and thiamorpholino, A is lower alkylene separating Am from the ring-nitrogen atom by at least two carbon atoms, and X is oxo, and acid addition salts thereof.

2. Compounds according to claim 1 and being selected from the group of compounds having the formula $$\begin{array}{c} Am-A \quad X \\ R_1 \quad | \quad \| \quad R_3 \\ N-C \\ R_b \quad \quad R_a \\ R_2 \quad O \quad R_4 \end{array}$$

in which one of the groups $R_a$ and $R_b$ is a nitro group and consisting of hydrogen and nitro, each of the groups $R_1$, the other represents a member selected from the group $R_2$, $R_3$ and $R_4$ is a member selected from the group consisting of hydrogen, lower alkyl, lower alkoxy, trifluoromethyl, nitro, amino and halogeno, and Am, A and X have the meaning given in claim 1, and acid addition salts thereof.

3. Compounds according to claim 1 and being selected from the group of compounds having the formula $$\begin{array}{c} Am-A \quad O \\ R_1 \quad | \quad \| \quad R_3 \\ N-C \\ R_b \quad \quad R_a \\ R_2 \quad O \quad R_4 \end{array}$$

in which one of the groups $R_a$ and $R_b$ is a nitro group and the other represents a member selected from the group consisting of hydrogen and nitro, each of the groups $R_1$, $R_2$, $R_3$ and $R_4$ is a member selected from the group consisting of hydrogen, lower alkyl, lower alkoxy, trifluoromethyl, nitro, amino and halogeno, Am is a member selected from the group consisting of lower alkyl-amino, di-lower alkyl-amino, alkyleneimino with 4-6 carbon atoms in the alkylene portion, 4-lower alkyl-piperazino and morpholino, and A is lower alkylene separating Am from the ring nitrogen atom by 2-3 carbon atoms, and acid addition salts thereof.

4. Compounds according to claim 1, and being selected from the group of compounds consisting of 10-(3-dimethylaminopropyl) - 2 - nitro - 11 - oxo - 10,11 - di - hydro-dibenzo[b,f][1,4]oxazepine and acid addition salts thereof.

5. Compounds according to claim 1, and being selected from the group of compounds consisting of 10-(3-methylaminopropyl) - 2 - nitro - 11 - oxo - 10,11 - dihydro - dibenzo[b,f][1,4]oxazepine and acid addition salts thereof.

6. Compounds according to claim 1, and being selected from the group of compounds consisting of 10-(3-dimethylaminopropyl) - 7 - nitro - 11 - oxo - 10,11 - dihydro - dibenzo[b,f][1,4]oxazepine and acid addition salts thereof.

7. Compounds according to claim 1, and being selected from the group of compounds consisting of 8-chloro-10- (3 - dimethylaminopropyl) - 2 - nitro - 11 - oxo - 10,11 - dihydro-dibenzo[b,f][1,4]oxazepine and acid addition salts thereof.

8. Compounds according to claim 1, and being selected from the group of compounds consisting of 10-(3-dimethylaminopropyl) - 8 - methyl - 2 - nitro - 11 - oxo - 10,11 - dihydro-dibenzo[b,f][1,4]oxazepine and acid addition salts thereof.

9. Compounds according to claim 1, and being selected from the group of compounds consisting of 10-(3-dimethylaminopropyl) - 2,7 - dinitro - 11 - oxo - 10,11 - dihydro-dibenzo[b,f][1,4]oxazepine and acid addition salts thereof.

10. Compounds according to claim 1, and being selected from the group of compounds consisting of 8-acetyl - 10 - (3 - dimethylaminopropyl) - 2 - nitro - 11 - oxo-10,11-dihydro-dibenzo[b,f][1,4]oxazepine and acid addition salts thereof.

11. Compounds according to claim 1, and being selected from the group of compounds consisting of 10-(3-dimethylaminopropyl) - 3 - nitro - 11 - oxo - 10,11 - dihydro-dibenzo[b,f]oxazepine and acid addition salts thereof.

References Cited

UNITED STATES PATENTS

| 2,852,510 | 9/1958 | Hoffmann et al. | 260—239.3 |
| 3,210,372 | 10/1965 | Werner et al. | 260—239.3 |
| 3,337,536 | 8/1967 | Schmutz et al. | 260—239.3 |
| 3,367,930 | 2/1968 | Schmutz et al. | 260—239.3 |

HENRY R. JILES, *Primary Examiner.*

R. T. BOND, *Assistant Examiner.*

U.S. Cl. X.R.

260—239, 247.5, 268, 293, 326.81; 424—244, 246, 248, 250, 267, 274

CASE CIN-6/1+2/E

PO-1050
(5/69)

UNITED STATES PATENT OFFICE
CERTIFICATE OF CORRECTION

Patent No. 3,423,402        Dated January 21, 1969

Inventor(s) Kuppuswamy Nagarajan

It is certified that error appears in the above-identified patent and that said Letters Patent are hereby corrected as shown below:

Column 3, in the formula, lines 2-9, " 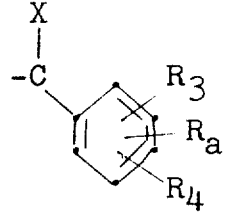 " should be

-- 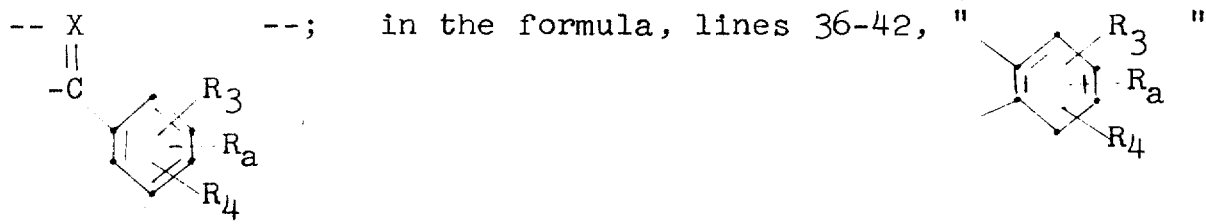 --; in the formula, lines 36-42, " 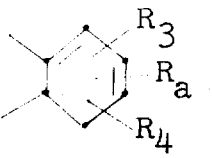 "

should be -- 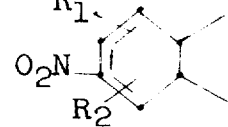 --.

Column 7, in the second formula, lines 16-23, " 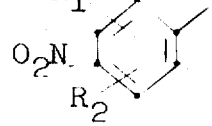 "

should be -- 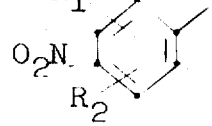 --; in the first formula, lines 28-35,

" 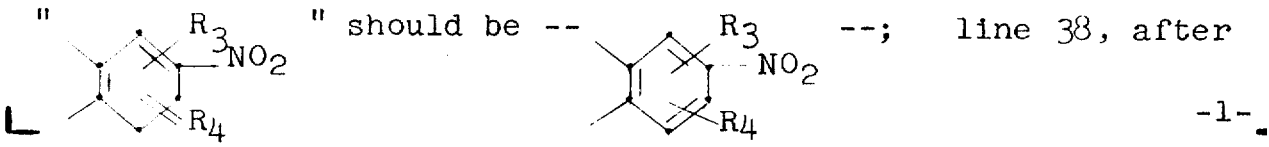 " should be -- 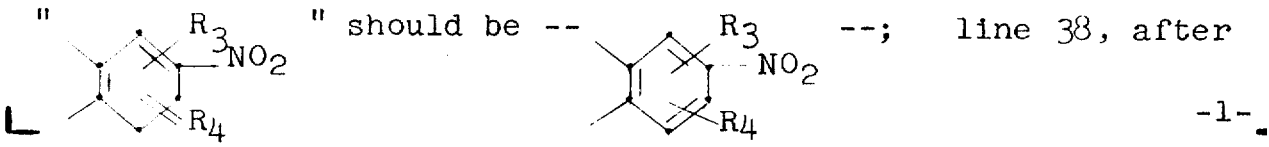 --; line 38, after

-1-

CASE CIN-6/1+2/E 3,423,402

"X" delete "preferably" and reinsert on line 39 after "R₄".

Column 9, in the formula " 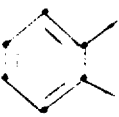 " should be --  --.

Column 16, line 35, "dro[b,f]" should be -- dro-dibenzo[b,f] -
line 41, "benzo[b,f]" should be -- dibenzo[b,f] --.

Column 18, reverse lines 21 and 22.

Column 19, line 12, before "oxazepine" insert -- [1,4] --.

SIGNED AND
SEALED
JUN 9 1970

(SEAL)
Attest:

Edward M. Fletcher, Jr.
Attesting Officer

WILLIAM E. SCHUYLER, JR.
Commissioner of Patents